United States Patent [19]

Beffa

[11] Patent Number: 4,493,798
[45] Date of Patent: Jan. 15, 1985

[54] METAL COMPLEXES OF DISAZO DYES

[75] Inventor: Fabio Beffa, Riehen, Switzerland

[73] Assignee: Ciba Geigy Corporation, Ardsley, N.Y.

[21] Appl. No.: 299,690

[22] Filed: Sep. 8, 1981

[30] Foreign Application Priority Data

Sep. 19, 1980 [CH] Switzerland .................. 7060/80

[51] Int. Cl.$^3$ .............................................. C09B 45/00
[52] U.S. Cl. .................................. 534/697; 534/695; 534/709
[58] Field of Search ..................... 260/145 B, 147

[56] References Cited

U.S. PATENT DOCUMENTS

| | | | |
|---|---|---|---|
| 1,984,096 | 12/1934 | Straub et al. | 260/145 B |
| 2,820,782 | 1/1958 | Maderni et al. | 260/145 B |
| 3,185,676 | 5/1965 | Klein | 260/145 B |
| 3,203,948 | 8/1965 | Neier | 260/145 B |
| 3,221,003 | 11/1965 | Scholl et al. | 260/145 B |
| 3,314,932 | 4/1967 | Scholl et al. | 260/145 B |
| 4,116,952 | 9/1978 | Beffa et al. | 260/145 B |
| 4,212,801 | 7/1980 | Baumann | 260/145 B X |
| 4,315,854 | 2/1982 | Püntener et al. | 260/145 B X |
| 4,331,596 | 5/1982 | Beffa et al. | 260/145 B X |

Primary Examiner—Helen M. S. Sneed

Attorney, Agent, or Firm—Edward McC. Roberts

[57] ABSTRACT

Metallizable disazo dyes of the formula (1)

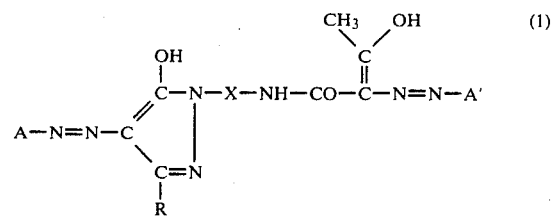

in which A and A' independently of one another are each the radical of a diazo component of the benzene or naphthalene series, at least one of the groups A or A' carrying a metallizable hydroxyl or carboxyl group in the o-position relative to the azo group, and X is substituted or unsubstituted phenylene, naphthylene or $C_2$–$C_4$-alkylene and R is $C_1$–$C_4$-alkyl, COO-Q or $CONQQ_1$, in which Q and $Q_1$ are each hydrogen or $C_1$–$C_4$-alkyl.

In the form of their cobalt or chromium complexes, the dyes are suitable for dyeing natural or synthetic polyamide materials, and especially wool or leather.

11 Claims, No Drawings

METAL COMPLEXES OF DISAZO DYES

The present invention relates to metallisable disazo dyes of the formula (1)

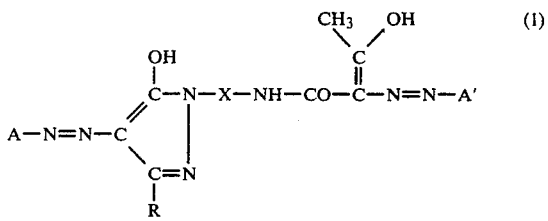

in which A and A' independently of one another are each the radical of a diazo component of the benzene or naphthalene series, at least one of the groups A or A' carrying a metallisable hydroxyl or carboxyl group in the o-position relative to the azo group, and X is substituted or unsubstituted phenylene, naphthylene or $C_2$–$C_4$-alkylene and R is $C_1$–$C_4$-alkyl, COO—Q or $CONQQ_1$, in which Q and $Q_1$ are each hydrogen or $C_1$–$C_4$-alkyl, and metal complexes thereof.

The radicals A and A' can be different or, preferably, identical. They can also carry one or more other substituents, for example low-molecular alkyl or alkoxy, chlorine, bromine, nitro, cyano, sulfo or acylamino. Low-molecular alkyl or alkoxy groups are to be understood as meaning those having 1–6, preferably 1–2, C atoms, and "acylamino groups" are low-molecular alkanoylamino, alkylsulfonylamino and alkoxycarbonylamino radicals and aroylamino and arylsulfonylamino radicals.

The radicals A and A' are derived, for example, from the following amines: anthranilic acid, 4- or 5-sulfoanthranilic acid, 2-amino-1-hydroxybenzene, 4-chloro- or 4,6-dichloro-2-amino-1-hydroxybenzene, 4- or 5-nitro-2-amino-1-hydroxybenzene, 4-chloro-, 4-methyl- or 4-acetylamino-6-nitro-2-amino-1-hydroxybenzene, 6-acetylamino- or 6-chloro-4-nitro-2-amino-1-hydroxybenzene, 4-cyano-2-amino-1-hydroxybenzene, 4-methoxy-2-amino-1-hydroxybenzene, 4-methoxy-5-chloro-2-amino-1-hydroxybenzene, 4-methyl-2-amino-1-hydroxybenzene, 4-chloro-5-nitro-2-amino-1-hydroxybenzene, 3,4,6-trichloro-2-amino-1-hydroxybenzene, 6-acetylamino-4-chloro-2-amino-1-hydroxybenzene, 4,6-dinitro-2-amino-1-hydroxybenzene, 2-amino-1-hydroxybenzene-4- or -5-sulfonic acid, 4-nitro-2-amino-1-hydroxybenzene-6-sulfonic acid, 5-nitro- or 6-nitro-2-amino-1-hydroxybenzene-4-sulfonic acid, 4-chloro-2-amino-1-hydroxybenzene-6-sulfonic acid, 1-amino-2-hydroxynaphthalene-4-sulfonic acid, 1-amino-2-hydroxy-6-nitronaphthalene-4-sulfonic acid, 2-amino-1-hydroxybenzene-4,6-disulfonic acid and 6-chloro-2-amino-1-hydroxybenzene-4-sulfonic acid.

Preferably, both A and A' carry a hydroxyl or carboxyl group in the o-position relative to the azo bridge, but one of the radicals A or A' can be free from such groups. A radical A or A' which is free from such groups can be, for example, a benzene or naphthalene radical which is unsubstituted or mono- or poly-substituted by identical or different substituents from the series comprising sulfo, chlorine, nitro, $C_1$–$C_4$-alkyl and $C_1$–$C_4$-alkoxy.

In the most preferred dyes, A and A' are 1-hydroxy-2-aminobenzene radicals which are substituted by chlorine, nitro and/or sulfo, in particular 1-hydroxy-2-amino-nitrobenzene radicals which also carry sulfo groups.

In the disazo dyes of the above formula (1), X is a $C_2$–$C_4$-alkylene group, such as an ethylene, propylene or butylene group, or a phenylene or naphthylene group which is unsubstituted or substituted by sulfo, halogen, such as chlorine or bromine, $C_1$–$C_4$-alkyl or $C_1$–$C_4$-alkoxy. X is preferably an unsubstituted phenylene group.

R is a $C_1$–$C_4$-alkyl group, such as methyl or ethyl, a carboxyl or $C_1$–$C_4$-carbalkoxy group, or a carboxamido group in which one or both of the amide hydrogen atoms can be replaced by $C_1$–$C_4$-alkyl. R is preferably the methyl group.

The present Application preferably relates to metal complex dyes, in particular chromium or cobalt complex dyes, which contain at least one disazo dye of the above formula (1). The metallisation can also take place on the material to be dyed. Preferably, however, the metal complex dye is first prepared and is then brought into contact with the material to be dyed.

A preferred group of metal complex dyes according to the invention comprises those of the formula (2)

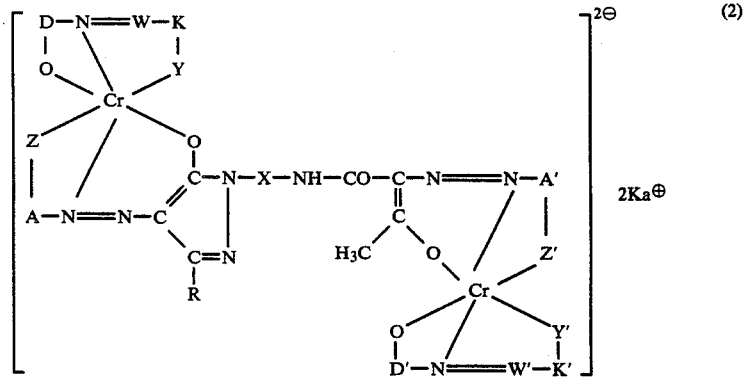

in which A and A' independently of one another are each the radical of a diazo component of the benzene or naphthalene series which carries the complexing group Z or Z' in the o-position relative to the azo group, X is substituted or unsubstituted phenylene, naphthylene or $C_2$–$C_4$-alkylene, R is $C_1$–$C_4$-alkyl, COOQ or $CONQQ_1$, in which Q and $Q_1$ are each hydrogen or $C_1$–$C_4$-alkyl, Z and Z' independently of one another are each oxygen or a —CO—O— group, W and W' independently of one another are each a nitrogen atom or a CH group, Y and Y' independently of one another are each an oxygen atom or a NH group, but Y and/or Y' must be an oxygen atom if W and/or W' is a CH group, D and D' independently of one another are each the radical of a diazo component of the benzene or naphthalene series which carries the complexing hydroxyl group in the o-position relative to the azo group, K and K' independently of one another are each the radical of a coupling component which couples in the o-position relative to the hydroxyl group or NH group, if W and/or W' is a nitrogen atom, or, if W and/or W' is the CH group, the radical of an o-hydroxyaldehyde, and $Ka^\oplus$ is a cation.

Suitable groups A, A', X and R are the groups listed for the disazo dyes of the formula (1), and those which are mentioned as preferred for the formula (1) are also particularly suitable for the metal complex dyes of the formula (2).

The radicals D and D' can be different or, preferably, identical. They are derived, for example, from the same amines listed above for the radicals A and A'. D and D' are preferably each a 1-hydroxy-2-aminobenzene or 1-amino-2-hydroxynaphthalene radical which is also substituted by nitro and/or sulfo.

The radicals K and K' can be different or, preferably, identical, and are derived, in particular, from the following groups of coupling components: phenols, phenylenediamines, naphthols, naphthylamines, pyrazolones, pyrazolimines, pyridones and acetoacetamides, especially acetoacetanilides.

These radicals can carry one or more other substituents, for example low-molecular alkyl or alkoxy, chlorine, bromine, nitro, cyano, sulfo or acylamino. Alkyl or alkoxy groups are to be understood as meaning those having 1-6, preferably 1-2, C atoms, and "acylamino groups" are low-molecular alkanoylamino, alkylsulfonylamino and alkoxycarbonylamino radicals and aroylamino and arylsulfonylamino radicals.

Preferred coupling components K and K' are: phenols which are unsubstituted or substituted by low-molecular alkyl or alkoxy or by amino or acylamino, where acylamino is as defined above, and which couple in the o-position, resorcinol, m-phenylenediamine which is unsubstituted or substituted in the 4-position by sulfo, chlorine, methyl or methoxy, naphthols which are unsubstituted or substituted by low-molecular alkyl or alkoxy or by amino, chlorine, acylamino or sulfo, where acylamino is as defined above, 5-pyrazolones or 5-aminopyrazoles which carry, in the 1-position, a phenyl or naphthyl radical which is unsubstituted or substituted by chlorine, nitro, low-molecular alkyl or alkoxy groups or sulfo groups, and which have, in the 3-position, a $C_1$-$C_4$-alkyl group, in particular a methyl group, naphthylamines which are unsubstituted or substituted by sulfo, sulfonamido or sulfone groups, acetoacetanilides and benzoylacetanilides which can be unsubstituted or substituted, in the anilide nucleus, by chlorine, bromine, low-molecular alkyl or alkoxy groups or sulfo groups, or 6-hydroxy-3-cyano- or 6-hydroxy-3-carboxamido-4-alkyl-2-pyridones which are substituted, in the 1-position, by low-molecular substituted or unsubstituted alkyl, for example methyl, isopropyl, β-hydroxyethyl, β-aminoethyl or γ-isopropoxypropyl, or by phenyl, and which can carry, in the 4-position, a low-molecular alkyl group, in particular methyl.

Examples of such coupling components are: 2-naphthol, 1,3- or 1,5-dihydroxynaphthalene, 1-naphthol, 1-acetylamino-7-naphthol, 1-propionylamino-7-naphthol, 1-carbomethoxyamino-7-naphthol, 1-carbethoxyamino-7-naphthol, 1-carbopropoxyamino-7-naphthol, 6-acetyl-2-naphthol, 2-naphthol-3-, -4-, -5-, -6-, -7- or -8-sulfonic acid, 1-naphthol-3-, -4- or -5-sulfonic acid, 4-methyl-1-naphthol, 4-methoxy-1-naphthol, 4-acetyl-1-naphthol, 5,8-dichloro-1-naphthol, 5-chloro-1-naphthol, 2-naphthylamine, 2-naphthylamine-1-sulfonic acid, 1-naphthylamine-4- or -5-sulfonic acid, 2-aminonaphthalene-6-sulfonic acid, 1-phenyl-3-methylpyrazol-5-one, 1-phenyl-5-pyrazolone-3-carboxylic acid amide, 1-(2'-, 3'- or 4'-methylphenyl)-3-methylpyrazol-5-one, 1-(2',3'- or 4'-sulfophenyl)-3-methylpyrazol-5-one, 1-(2'-chloro-5'-sulfophenyl)-3-methylpyrazol-5-one, 1-(2'- or 4'-methoxyphenyl)-3-methylpyrazol-5-one, 1-(2'-, 3'- or 4'-chlorophenyl)-3-methylpyrazol-5-one, 1-(2'-, 3'- or 4'-nitrophenyl)-3-methylpyrazol-5-one, 1-(2',5'- or 3',4'-dichlorophenyl)-3-methylpyrazol-5-one, 1-(2',5'-dichloro-4'-sulfophenyl)-3-methylpyrazol-5-one, 1-(2'-, 3'- or 4'-sulfophenyl)-3-methyl-5-aminopyrazole, 1-phenyl-3-methyl-5-aminopyrazole, 1-(2'-chloro-5'-sulfophenyl)-3-methyl-5-aminopyrazole, acetoacetanilide, acetoacetanilide-4-sulfonic acid, acetoacetic acid o-anisidide, acetoacetic acid o-toluidide, acetoacetic acid o-chloroanilide, acetoacetic acid m-xylidide, tetralol, 4-methylphenol, 3-dialkylaminophenols, in particular 3-dimethylamino- and 3-diethylaminophenol, 4-butylphenol, preferably 4-tert.-butylphenol, 4-amylphenol, especially 4-t-amylphenol, 2-isopropyl-4-methylphenol, 2- or 3-acetylamino-4-methylphenol, 2-methoxycarbonylamino-4-methylphenol, 2-ethoxycarbonylamino-4-methylphenol, 3,4-dimethylphenol, resorcinol, 1-methyl-3-cyano-4-ethyl-6-hydroxypyridone, 1-methyl-3-cyano-4-methyl-6-hydroxypyridone, 1-phenyl-3-carboxamido-4-methyl-6-hydroxypyridone and m-phenylenediamine.

The coupling components K and K' are preferably 1- or 2-naphthols which are unsubstituted or substituted by amino and/or sulfo, 1- or 2-naphthylamines which are unsubstituted or substituted by sulfo, p-($C_1$-$C_6$)alkyl-phenols, 1-phenyl-3-methyl-5-pyrazolones or acetoacetanilides, it being possible for the phenyl groups in the two latter compounds to be substituted by $C_1$-$C_4$-alkyl, $C_1$-$C_4$-alkoxy, chlorine or sulfo.

If W and/or W' is a CH group, K and/or K' is an o-hydroxyaldehyde radical, preferably the radical of a substituted or unsubstituted o-hydroxybenzaldehyde or o-hydroxynaphthaldehyde. Examples of suitable aldehydes are: 2-hydroxy-1-naphthaldehyde, 1-hydroxy-2-naphthaldehyde, 2-hydroxybenzaldehyde, 3- or 5-methyl-2-hydroxybenzaldehyde, 3,5-dimethyl-2-hydroxybenzaldehyde, 5-butyl-2-hydroxybenzaldehyde, 5-chloro- or 5-bromo-2-hydroxybenzaldehyde, 3-chloro-2-hydroxybenzaldehyde, 3,5-dichloro-2-hydroxybenzaldehyde, 5-sulfo-2-hydroxybenzaldehyde and 3-methyl-5-chloro-2-hydroxybenzaldehyde, and the aldehydes which can be derived therefrom and are substituted by arylazo.

The radicals D and D' and/or K and K' can carry further arylazo groups, so that D—N=W—K and/or D'—N=W'—K' can also be disazo dyes or azomethine-azo dyes. Dyes of the formula D—N=N—K are, in particular, the known metallisable dyes, for example the dyes listed as mordant dyes in the "Colour Index".

$Ka^\oplus$ is preferably lithium, potassium or, in particular, sodium. $Ka^\oplus$ can also be an ammonium cation or the ammonium salt of an organic amine.

Particularly suitable dyes according to the invention are those of the formula (3)

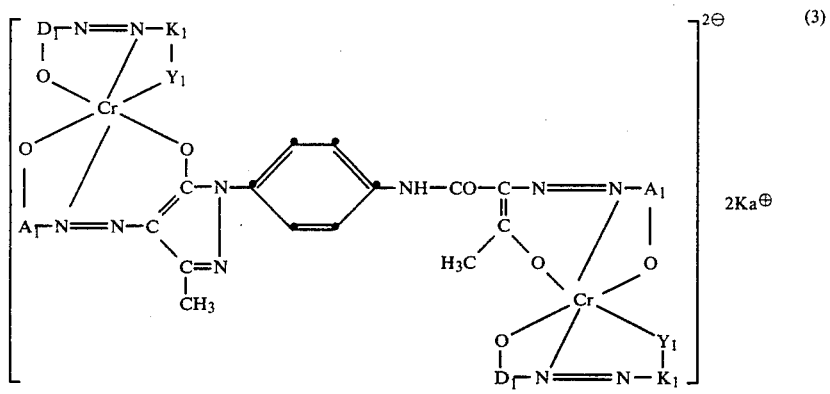

in which $D_1$ is a 1-hydroxy-2-aminobenzene or 1-amino-2-hydroxynaphthalene radical which is also substituted by nitro and/or sulfo, $K_1$ is the radical of a 1-naphthol or 2-naphthol which is unsubstituted or substituted by sulfo and/or amino, of a 1- or 2-naphthylamine, which is unsubstituted or substituted by sulfo, or of a p-($C_1$-$C_6$-)alkylphenol, 1-phenyl-3-methyl-5-pyrazolone or acetoacetanilide, it being possible for the phenyl group in the two latter radicals to be substituted by $C_1$-$C_4$-alkyl, $C_1$-$C_4$-alkoxy, chlorine or sulfo, $A_1$ is a 1-hydroxy-2-aminobenzene radical which is substituted by sulfo and/or nitro, $Y_1$ is oxygen or a NH group and $Ka^{\oplus}$ is a cation.

The metal-free disazo dyes of the formula (1) are obtained by methods which are known per se, for example by coupling a compound of the formula (4)

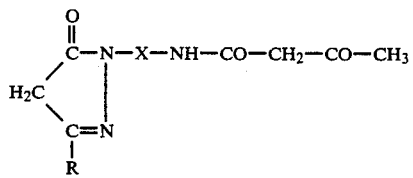

with a diazonium compound of an amine of the formula A—$NH_2$ and/or A'—$NH_2$. In these formulae, X, R, A and A' are as defined above.

The present invention also relates to the new intermediates of the formula (4)

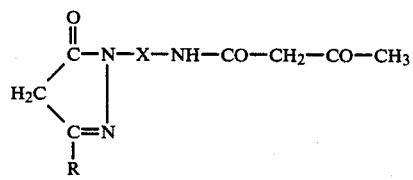

in which X is substituted or unsubstituted phenylene, naphthylene or $C_1$-$C_4$-alkylene and R is $C_1$-$C_4$-alkyl, COO—Q or CONQ$Q_1$, in which Q and $Q_1$ are each hydrogen or $C_1$-$C_4$-alkyl. These intermediates are obtained, for example, by reacting a pyrazolone of the formula (13)

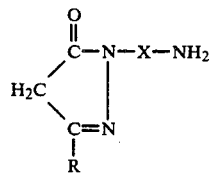

with diketene. 1-(4'-Aminophenyl)-3-methyl-5-pyrazolone is preferably used.

To prepare metal-free disazo dyes of the formula (1) in which A and A' are not identical, a compound of the formula (4) is coupled with a mixture of diazonium compounds of the amines of the formulae A—$NH_2$ and A'—$NH_2$. In this case, compounds of the formula (1) in which A and A' are not identical are obtained as a mixture with compounds containing two radicals A or two radicals A'.

The pure compounds of the formula (1) in which A and A' are not identical are obtained, for example, by coupling an acetylaminopyrazolone of the formula (14)

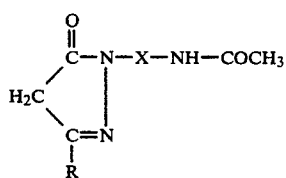

in which X is substituted or unsubstituted phenylene, naphthylene or $C_1$-$C_4$-alkylene and R is $C_1$-$C_4$-alkyl, COO—Q or CONQ$Q_1$, in which Q and $Q_1$ are each hydrogen or $C_1$-$C_4$-alkyl, with a diazonium compound of an amine of the formula A—$NH_2$, subsequently hydrolysing the coupling product and then reacting the hydrolysis product with diketene and coupling the resulting reaction product with a diazonium compound of an amine of the formula A'—$NH_2$.

The metal complex dyes containing at least one disazo dye of the formula (1) are prepared, for example, by reacting a disazo dye of the formula (1) with a metal-donating, in particular a cobalt- or chromium-donating, agent. The metallisation is carried out by conventional processes, for example with cobalt sulfate or acetate or chromium salicylate in weakly alkaline solution.

Chroming can also be carried out in the presence of a reducing agent. The disazo dyes are reacted with the metallising agents in a ratio of 1:1 or 1:2 under the conditions customary for these metallisation reactions. The metallisation can be carried out in aqueous, organic-aqueous or purely organic solvents, such as alcohols or ketones, if necessary with the addition of solubilising substances or substances which accelerate the metallisation, for example complexing agents.

In the case of the chromium complexes, it is also possible to react the disazo dye of the formula (1) with a 1:1 chromium complex dye to give the 1:2 chromium complex dye.

The chromium complex dyes of the formula (2)

with an azo dye and/or azomethine dye of the formula (5) and/or (6)

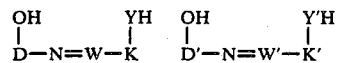

in which D, W, K, Y, D', W', Y' and K' are as defined above, in the presence of a chromium-donating agent in a ratio of about 1:2. In this case, the chromium complex dyes of the above formula (2) are obtained as a mixture

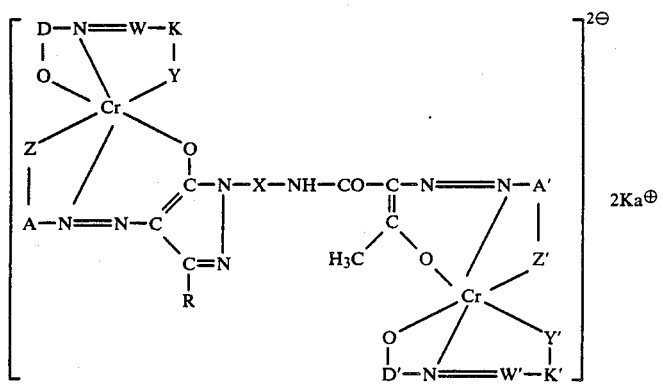

in which A and A' independently of one another are each the radical of a diazo component of the benzene or naphthalene series which carries the complexing group Z and Z' in the o-position relative to the azo group, X is substituted or unsubstituted phenylene, naphthylene or $C_2$–$C_4$-alkylene, R is $C_1$–$C_4$-alkyl, COOQ or CONQQ$_1$, in which Q and Q$_1$ are each hydrogen or $C_1$–$C_4$-alkyl, Z and Z' independently of one another are each oxygen or a —CO—O— group, W and W' independently of one another are each a nitrogen atom or a CH group, Y and Y' independently of one another are each an oxygen atom or a NH group, but Y and/or Y' must be an oxygen atom if W and/or W' is a CH group, D and D' independently of one another are each the radical of a diazo component of the benzene or naphthalene series which carries the complexing hydroxyl group in the o-position relative to the azo group, K and K' independently of one another are each the radical of a coupling component which couples in the o-position relative to the hydroxyl group or NH group, if W and/or W' is a nitrogen atom, or, if W and/or W' is the CH group, the radical of an o-hydroxyaldehyde, and Ka⊕ is a cation, are prepared, for example, by reacting a disazo dye of the formula (1)

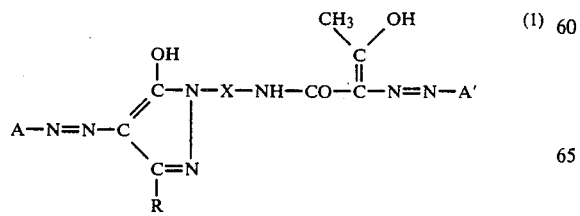

with other chromium complex dyes.

However, the chromium complex dyes of the above formula (2) are preferably prepared by reacting a disazo dye of the formula (1)

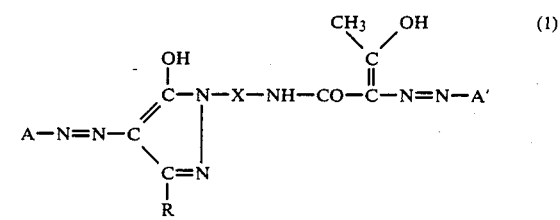

with a chromium complex dye of the formula (8) and/or (9)

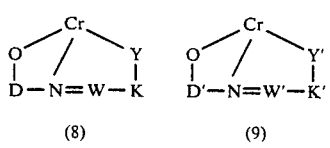

in a ratio of about 1:2.

The preferred chromium complex dyes of the formula (3)

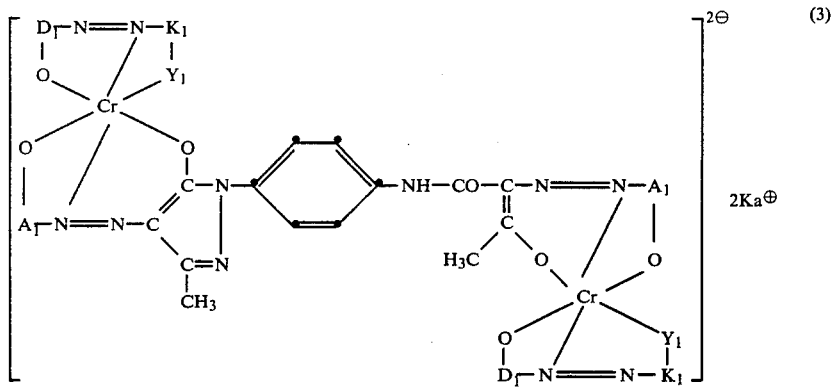

in which $D_1$ is a 1-hydroxy-2-aminobenzene or 1-amino-2-hydroxynaphthalene radical which is also substituted by nitro and/or sulfo, $K_1$ is the radical of a 1-naphthol or 2-naphthol which is unsubstituted or substituted by sulfo and/or amino, of a phenol which is substituted in the p-position by $C_1-C_6$-alkyl, of a 1- or 2-naphthylamine which is unsubstituted or substituted by sulfo, or of a 1-phenyl-3-methyl-5-pyrazolone or acetoacetanilide, it being possible for the phenyl group in the two latter compounds to be substituted by $C_1-C_4$-alkyl, $C_1-C_4$-alkoxy, chlorine or sulfo, $Y_1$ is oxygen or a NH group, $Ka^{\oplus}$ is a cation and $A_1$ is a 1-hydroxy-2-aminobenzene radical which is substituted by sulfo and/or nitro, are preferably prepared by reacting a disazo dye of the formula (11)

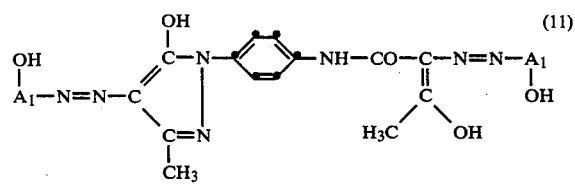

with a 1:1 chromium complex dye of the formula (12)

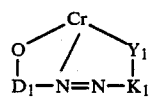

(12)

in which $D_1$, $K_1$ and $Y_1$ are as defined, in a ratio of about 1:2.

The metal-free disazo dyes of the formula (1) are suitable for dyeing wool, by a process in which the dyeing is after-treated on the fibre by means of metal-donating agents, preferably chromium- or cobalt-donating agents.

The novel metal complex dyes which can be obtained by the above processes are advantageously isolated in the form of their salts, in particular their alkali metal salts, such as their lithium, potassium and, especially, sodium salts, or in the form of their ammonium salts. They are suitable for dyeing various natural or synthetic polyamide materials and polyurethanes, and especially for dyeing wool or, in particular, leather.

The novel dyes have a good tinctorial strength, and cover well. They have a good affinity, coupled with good fastness properties, such as good fastness to washing, water, perspiration, rubbing, diffusion, light, acid and alkali, and are stable to acids and alkalis. Their good build-up capacity on various types of leather, both on leather which has been tanned only with chromium salts and on leather which has been retanned with vegetable or synthetic tanning agents, deserves particular mention. Deep orange-red to brown shades and black shades are obtained.

In the following examples, the parts and percentages are by weight, unless otherwise indicated. The temperatures are in degrees Centigrade.

EXAMPLE 1

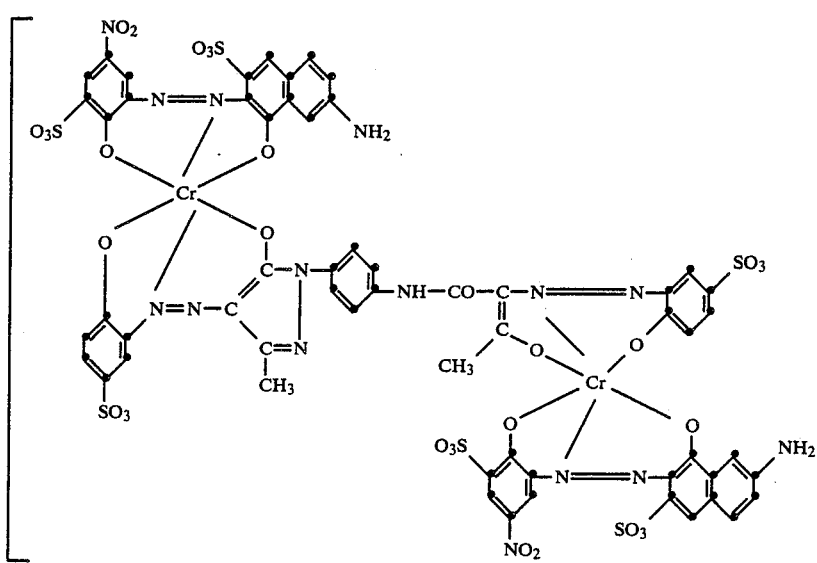

53.4 parts of the chromium complex of the type 1 atom of chromium:1 molecule of dye, comprising 5.2 parts of chromium and 48.4 parts of the monoazo dye obtained from diazotised 4-nitro-2-amino-1-hydroxybenzene-6-sulfonic acid and 2-amino-8-hydroxynaphthalene-6-sulfonic acid are suspended in 1,000 parts by volume of water, together with 33.7 parts of the disazo dye obtained by alkaline coupling of 2 molecules of diazotised 2-amino-1-hydroxybenzene-4-sulfonic acid to 1 molecule of 1-(4'-acetoacetylaminophenyl)-3-methyl-5-pyrazolone. The mixture is heated to 80°-85°, while simultaneously increasing the pH value to 7 to 7.5 by addition of 5N sodium hydroxide solution, and is kept at this temperature and at a constant pH value, by further addition of 5N sodium hydroxide solution, until the starting materials have disappeared. The resulting, novel, chromium-containing dye is then precipitated by addition of sodium chloride. It is filtered off and dried. After having been dried, it is a dark water-soluble powder which dyes leather in brown shades.

The 1-(4'-acetoacetylaminophenyl)-3-methyl-5-pyrazolone used in the above example is obtained, for example, by dissolving the sodium salt of 1-(4'-aminophenyl)-3-methyl-5-pyrazolone in water and reacting this compound with diketene at 50°-55° until it is no longer present.

EXAMPLE 2

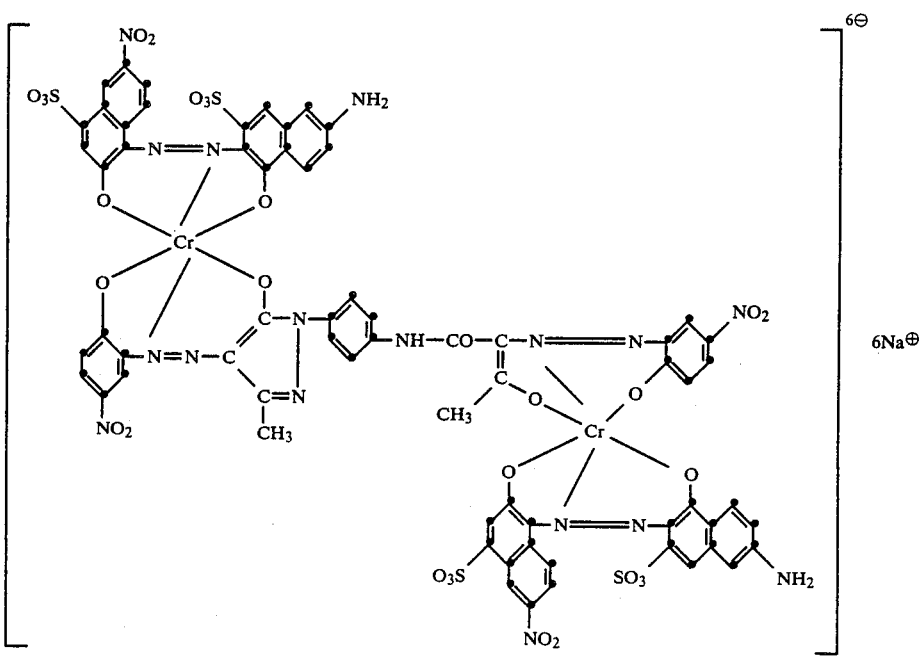

58.4 parts of the chromium complex of the type 1 atom of chromium:1 molecule of dye, comprising 5.2 parts of chromium and 53.4 parts of the monoazo dye obtained from diazotised 6-nitro-1-amino-2-hydroxynaphthalene-4-sulfonic acid and 2-amino-5-hydroxynaphthalene-7-sulfonic acid are suspended in 750 parts by volume of ethylene glycol, together with 30.1 parts of the disazo dye obtained by alkaline coupling of 2 molecules of diazotised 4-nitro-2-amino-1-hydroxybenzene to 1 molecule of 1-(4'-acetoacetylaminophenyl)-3-methyl-5-pyrazolone. The mixture is heated to 80° to 85°, while simultaneously increasing the pH value to 7 to 7.5 by addition of 5N sodium hydroxide solution, and is kept at this temperature and at a constant pH value, by further addition of 5N sodium hydroxide solution, until the starting materials have disappeared. The resulting, novel, chromium-containing dye is precipitated by addition of saturated sodium chloride solution, filtered off and dried. It is a dark water-soluble powder which dyes leather in dark brown shades with good fastness properties.

pyrazolone are suspended in 1,000 parts by volume of water, together with 38.1 parts of the disazo dye obtained by alkaline coupling of 2 molecules of diazotised 4-nitro-2-amino-1-hydroxybenzene-6-sulfonic acid to 1 molecule of 1-(4'-acetoacetylaminophenyl)-3-methyl-5-pyrazolone. The reaction mixture is heated to 80°–85° C., while simultaneously increasing the pH value to 7 to 7.5 by addition of 5N sodium hydroxide solution, and is kept at this temperature and at a constant pH value, by addition of 5N sodium hydroxide solution, until the starting materials have disappeared. The novel, chromium-containing dye is precipitated by adding sodium chloride. It is then filtered off and washed out with dilute sodium chloride solution. After having been dried, it is a dark powder which dissolves in water giving an orange-coloured solution and dyes leather in orange shades.

Dyes with similar properties are obtained when the 1:1 chromium complex of the compound mentioned in

EXAMPLE 3

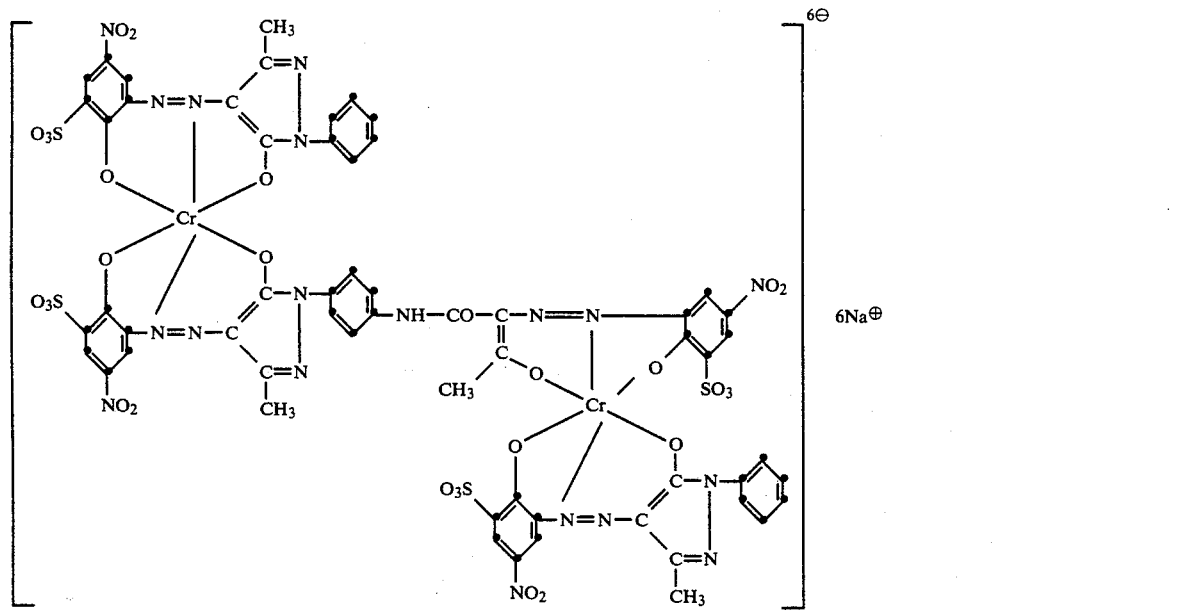

46.9 parts of the chromium complex of the type 1 atom of chromium:1 molecule of dye, comprising 5.2 parts of chromium and 41.9 parts of the monoazo dye obtained from diazotised 4-nitro-2-amino-1-hydroxybenzene-6-sulfonic acid and 1-phenyl-3-methyl-5- column I is reacted, in a ratio of 2:1, with the disazo dye given in column II. The dyes dye leather, with good fastness properties, in the shades given in column III.

TABLE

| No. | I | II | III |
|---|---|---|---|
| 1 | [structure: naphthalene with OH, HO₃S, N=N, NO₂ substituents] | [structure: OH, N=N−C, NO₂, pyrazole with CH₃, C=N, NH−CO−C=N−N, CH₃, OH, NO₂] | Brown |
| 2 | [structure: HO₃S, OH, N=N, naphthalene with OH, NO₂] | " | Brown |

TABLE-continued

| No. | I | II | III |
|---|---|---|---|
| 3 | O₂N-C₆H₂(OH)(SO₃H)-N=N-C₁₀H₆-OH | " | Brown |
| 4 | HO₃S-C₆H₂(OH)(NO₂)-N=N-C₆H₂(OH)(C₄H₉t) | " | Brown |
| 5 | (OH)(NO₂)C₆H₃-N=N-C(=C(OH)-N(C₆H₄SO₃H)-N=C-CH₃) | " | Orange |
| 6 | HO₃S-C₆H₂(OH)(NO₂)-N=N-C(=C(OH)-N(C₆H₅)-N=C-CH₃) | " | Orange |
| 7 | HO₃S-C₆H₂(OH)(NO₂)-N=N-C₁₀H₆-OH | " | Brown |
|   | (OH)C₆H₂(SO₃H)-(NO₂ on naphthyl)-N=N-C₁₀H₆-OH | | |
| 8 | HO₃S-C₆H₂(OH)(NO₂)-N=N-C₁₀H₆-OH | " | Brown |

TABLE-continued

| No. | I | II | III |
|---|---|---|---|
| | (structure) | | |
| 9 | (structure) | (structure) | Brown |
| 10 | (structure) | " | Brown |
| 11 | (structure) | " | Orange |
| 12 | (structure) | (structure) | Bluish-tinged brown |
| 13 | (structure) | " | Reddish-tinged brown |
| 14 | (structure) | " | Reddish tinged brown |
| 15 | (structure) | " | Greenish tinged brown |

TABLE-continued

| No. | I | II | III |
|---|---|---|---|
| 16 | (structure: naphthalene with OH, HO₃S, NO₂ substituents, azo linked to naphthalene with OH, SO₃H, NH₂) | " | Grey-black |
| 17 | (structure: phenol with OH, NO₂ azo-linked to phenol with OH, C₄H9t) | " | Red-brown |
| 18 | (structure: phenol with HO₃S, OH, NO₂ azo-linked to phenol with OH, C₄H9t) | " | Orange-tinged brown |
| 19 | (structure: pyrazolone derivative with OH, NO₂ substituted phenyl and SO₃H-phenyl, CH₃) | " | Orange |
| 20 | (structure: pyrazolone derivative with HO₃S, OH, NO₂ substituted phenyl and phenyl, CH₃) | " | Orange |
| 21 | (structure: phenol with OH, NO₂ azo-linked to naphthalene with NH₂, SO₃H) | " | Olive-brown |
| 22 | (structure: phenol with OH, Cl azo-linked to naphthol) | " | Violet-tinged brown |

| No. | I | II | III |
|---|---|---|---|
| 23 | (structure: 2-hydroxy-5-sulfophenylazo-2-naphthol) | " | Red-brown |
| 24 | (structure: 2-hydroxy-5-nitrophenylazo-2-naphthol) | " | Reddish-tinged brown |
| 25 | (structure: salicylidene of 2-hydroxy-3-amino-5-nitrobenzenesulfonic acid) | (disazo pyrazolone structure) | Yellowish-tinged orange |
| 26 | " | (disazo pyrazolone structure) | Yellowish-tinged orange |
| 27 | (structure: 2-hydroxy-4-nitrophenylazo aminonaphthalenesulfonic acid) about 1:1 mixture (second structure) | (disazo pyrazolone structure) | Olive-brown |

EXAMPLE 4

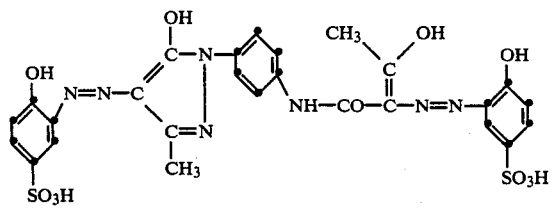

67.3 parts of the disazo dye which is obtained by alkaline coupling of 2 molecules of diazotised 2-amino-1-hydroxybenzene-4-sulfonic acid to 1 molecule of 1-(4′-acetoacetylaminophenyl)-3-methyl-5-pyrazolone are suspended in 800 parts by volume of water. The pH value of the suspension is adjusted to about 8 by addition of 5N sodium hydroxide solution, the temperature simultaneously being increased to about 90°. A mixture of 51.5 parts of cobalt sulfate heptahydrate and 22.5 parts of tartaric acid in 200 parts by volume of water, which had likewise been adjusted to pH 8.5 with 5N sodium hydroxide solution, is then added, and the mixture is kept at 90°–95° until the starting dye has disappeared. The cobalt complex formed is precipitated by addition of sodium chloride, filtered off, washed out with dilute sodium chloride solution and dried. After having been dried, it is a dark water-soluble powder which dyes leather in brownish-tinged orange shades with good fastness properties.

DYEING INSTRUCTIONS FOR LEATHER 100 parts of suede clothing leather (dry weight) are drummed at 50° in a solution of 1,000 parts by volume of water and 2 parts of 24% ammonia for 2 hours, and are then dyed in a solution of 1,000 parts by volume of water, 2 parts of 24% ammonia and 2 parts of the dye from Example 1 at 60° for one hour. A solution of 40 parts by volume of water and 4 parts of 85% formic acid is then added, and dyeing is continued for a further 30 minutes. The leather is then rinsed thoroughly and, if desired, also treated with 2 parts of a dicyandiamide/-formaldehyde condensation product for 30 minutes at 50°.

Other suede leather and gloving leather can be dyed in the same manner.

The brown dyeings thus obtained are distinguished by generally good fastness properties and a very good covering power.

What is claimed is:

1. A metal complex dye containing a disazo dye of the formula

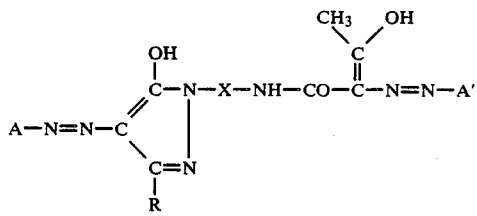

in which A and A' independently of one another are each the radical of a diazo component of the benzene or naphthalene series, at least one of the groups A or A' carrying a metallizable hydroxyl or carboxyl group in the o-position relative to the azo group, and X is phenylene, naphthylene, $C_2$-$C_4$-alkylene, sulfophenylene, sulfonaphthylene, halophenylene, halonaphthylene, $C_1$-$C_4$-alkylphenylene, $C_1$-$C_4$-alkylnaphthylene, $C_1$-$C_4$-alkoxyphenylene or $C_1$-$C_4$-alkoxynaphthylene and R is $C_1$-$C_4$-alkyl, COO—Q or CONQQ$_1$, in which Q and Q$_1$ are each hydrogen or $C_1$-$C_4$-alkyl.

2. A chromium complex dye of claim 1, of the formula

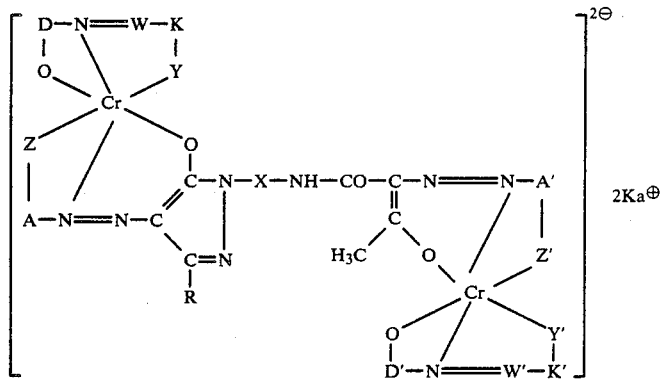

wherein A and A' independently of one another are each the radical of a diazo component of the benzene or naphthalene series which carries the complexing group Z or Z' in the o-position relative to the azo group, Z and Z' independently of one another are each oxygen or a —CO—O— group, W and W' independently of one another are each a nitrogen atom or a CH group, Y and Y' independently of one another are each an oxygen atom or a NH group, but Y and/or Y' must be an oxygen atom if W and/or W' is a CH group, D and D' independently of one another are each the radical of a diazo component of the benzene or naphthalene series which carries a complexing hydroxyl group in the o-position relative to the azo group, K and K' independently of one another are each the radical of a coupling component which couples in the o-position relative to the hydroxyl group or NH group, if W and/or W' is a nitrogen atom, or, if W and/or W' is the CH group, the radical of an o-hydroxyaldehyde, and Ka$^\oplus$ is a cation.

3. A metal complex dye of either of claims 1 or 2, in which A and A' are each a 1-hydroxy-2-aminobenzene radical which is substituted by chlorine, nitro and/or sulfo.

4. A metal complex dye of claim 1, in which A and A' are identical.

5. A metal complex dye of claim 4, wherein X is phenylene, sulfo phenylene, halo phenylene, $C_1$-$C_4$-alkylphenylene, or $C_1$-$C_4$-alkoxyphenylene, and R is methyl.

6. A metal complex dye of claim 5, in which X is unsubstituted phenylene.

7. A chromium complex dye of claim 2, in which D and D' independently of one another are each a 1-hydroxy-2-aminobenzene or 1-amino-2-hydroxynaphthalene radical which is also substituted by nitro and/or sulfo and K and K' independently of one another are each the radical of one of the following coupling components: 1-naphthol or 2-naphthol which is unsubstituted or substituted by sulfo and/or amino, 1- or 2-naphthylamine which is unsubstituted or substituted by sulfo, p-($C_1$-$C_6$)alkylphenol, or 1-phenyl-3-methyl-5-pyrazolone or acetoacetanilide, it being possible for the phenyl group in the two latter compounds to be substituted by $C_1$-$C_4$-alkyl, $C_1$-$C_4$-alkoxy, chlorine or sulfo.

8. A chromium complex dye of claim 7, in which D is identical to D' and K is identical to K'.

9. A chromium complex dye of the formula

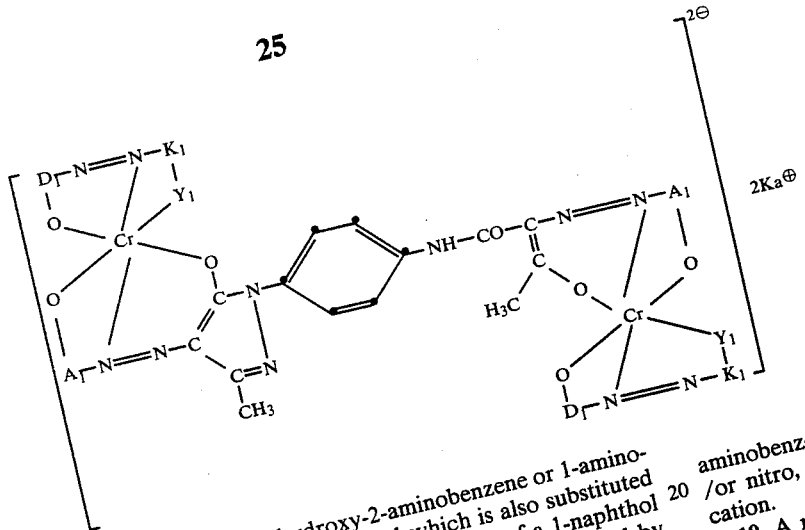

in which $D_1$ is a 1-hydroxy-2-aminobenzene or 1-amino-2-hydroxynaphthalene radical which is also substituted by nitro and/or sulfo, $K_1$ is the radical of a 1-naphthol or 2-naphthol which is unsubstituted or substituted by sulfo and/or amino, of a 1- or 2-naphthylamine, which is unsubstituted or substituted by sulfo, or of a p-($C_1$-$C_6$)alkyl phenol, 1-phenyl-3-methyl-5-pyrazolone or acetoacetanilide, it being possible for the phenyl group in the two latter radicals to be substituted by $C_1$-$C_4$-alkyl, $C_1$-$C_4$-alkoxy, chlorine or sulfo, $A_1$ is a 1-hydroxy-2-aminobenzene radical which is substituted by sulfo and/or nitro, $Y_1$ is oxygen or a NH group and $Ka^{\oplus}$ is a cation.

10. A metal complex dye of claim 8, wherein A and A' are each a 1-hydroxy-2-amino-nitrobenzene radical which may also carry a sulfo group.

11. A metal complex dye of claim 10, wherein A and A' are identical, X is phenylene and R is methyl.

* * * * *

UNITED STATES PATENT AND TRADEMARK OFFICE
CERTIFICATE OF CORRECTION

PATENT NO. : 4,493,798
DATED : January 15, 1985
INVENTOR(S) : Fabio Beffa

It is certified that error appears in the above-identified patent and that said Letters Patent is hereby corrected as shown below:

Claim 6, Column 24, Line 52 should read-- phenylene.    --.

Signed and Sealed this

Eighth Day of October 1985

[SEAL]

Attest:

Attesting Officer

DONALD J. QUIGG

Commissioner of Patents and Trademarks—Designate